Nov. 29, 1960     J. F. DOBRY ET AL     2,962,081
APPARATUS FOR PRODUCING DECORATIVE COMPOSITION SHEETS
Filed May 20, 1957     4 Sheets-Sheet 1

INVENTORS.
WALTER E. BENEDICT
JOSEPH F. DOBRY
BY
ATTORNEY

Nov. 29, 1960  J. F. DOBRY ET AL  2,962,081
APPARATUS FOR PRODUCING DECORATIVE COMPOSITION SHEETS
Filed May 20, 1957  4 Sheets-Sheet 2

INVENTORS,
WALTER E. BENEDICT
JOSEPH F. DOBRY
BY
Richard T. Laughlin
ATTORNEY

Nov. 29, 1960   J. F. DOBRY ET AL   2,962,081
APPARATUS FOR PRODUCING DECORATIVE COMPOSITION SHEETS
Filed May 20, 1957   4 Sheets-Sheet 3

INVENTORS.
WALTER E. BENEDICT
JOSEPH F. DOBRY
BY
ATTORNEY

Nov. 29, 1960 J. F. DOBRY ET AL 2,962,081
APPARATUS FOR PRODUCING DECORATIVE COMPOSITION SHEETS
Filed May 20, 1957 4 Sheets-Sheet 4

INVENTORS.
WALTER E. BENEDICT
JOSEPH F. DOBRY
BY
ATTORNEY

United States Patent Office 2,962,081
Patented Nov. 29, 1960

2,962,081

APPARATUS FOR PRODUCING DECORATIVE COMPOSITION SHEETS

Joseph F. Dobry, Langhorne, and Walter E. Benedict, Newtown, Pa., assignors to Congoleum-Nairn Inc., Kearny, N.J., a corporation of New York Filed May 20, 1957, Ser. No. 660,241

6 Claims. (Cl. 154—20)

This invention relates to plastic composition sheets and particularly to such sheets which are wear resistant and decorative and adapted for use as flexible, smooth surface coverings for floors, walls, articles of furniture and the like.

Plastic composition sheets have been produced having complex geometric designs by the use of stencils. This procedure is carried out by covering a backing sheet such as felt with various colored pieces of plastic composition in a predetermined pattern by a series of stencils which allow only a portion of the felt to be covered with each color. In this procedure, each prominent area of different color has a separate stencil. After the felt has been uniformly covered with pieces of plastic composition, it is fed to a press where, by the application of heat and pressure, the plastic pieces are molded together to form a smooth sheet. The cost of producing such designs is high because of the necessity of handling the individual colors and stencils, and careful handling of the felt prior to molding is essential to avoid altering the design from its predetermined pattern. The product has an additional disadvantage, in that when using large chips it does not have the smooth surface of a plastic sheet produced by conventional calendering, which makes the product less desirable from a floor maintenance standpoint.

A somewhat similar product is produced by the method disclosed in U.S. Patents No. 1,975,515, issued October 2, 1934, and No. 2,113,158, issued April 5, 1938, both to Frederick G. Mayer. In accordance with this method different colored chips of plastic composition are placed on a backing and molded in a press. This procedure produces a product which is similar to stone terrazzo, but lacks the mortar which surrounds each stone chip in the natural product.

An object of the invention is to produce a flexible smooth surface floor covering of plastic composition assimilating stone terrazzo. Another object of the invention is to produce such a floor covering in a simple and economical manner capable of adaptation to commercial processing. A further object is to provide a process for producing a plastic composition sheet having unique structural characteristics, long-wearing attributes and a distinctive and attractive decorative appearance.

In accordance with the invention, a flexible smooth surface floor covering resembling stone terrazzo is produced by depositing uniformly on a backing material a smooth layer of a mixture of fine particles of plastic composition of at least two distinct colors and then scattering materially larger, irregular, flat plastic chips on top of the fine particles in such a manner that the chips lie flat and relatively few of them overlap. The covered backing material is then subjected to a consolidating operation with the application of heat and pressure to form a smooth uniform sheet. In this manner, a floor covering of plastic composition is produced which closely resembles stone terrazzo, in that each chip is sharply outlined by an area, formed by the multi-colored fine particles, which resembles the mortar or cement matrix of stone terrazzo.

The use of fine particles of plastic composition as a background for the larger chips has a distinct operational advantage, in that it greatly facilitates the consolidating of the large chips into a smooth, defect-free sheet. The use of a mixture of particles of two or more colors is essential to give the background the appearance of a mortar or cement matrix. The fine particles must be of approximately uniform size, since too wide a range in size results in the loss of the simulation of mortar. It is preferred to use approximately equal proportions of the colored particles, although one color can predominate. The presence of one color in excess of about 70% will result in the loss of the desired effect. The use of a mixture of gray and white particles will closely resemble the color of conventional mortar. Particularly desirable products are obtained by having the mortar color contrasting or blending with the coloration of the large chips. The fine particles are preferably within the range of about 0.02 to about 0.06 inch in diameter. Particles larger than 0.06 inch are too readily distinguishable in the final product and will hinder the incorporation of the chips into the particles to form a smooth sheet. A particle size of less than about 0.02 inch generally is undesirable since it is not large enough to have character in the finished product. Generally up to about 15% of particles below about 0.02 can be tolerated as part of the fine particles without detracting from the appearance of the final product. The fine particles comprising the matrix, although they should represent about 50 to 70% of the total composition, will cover only about 10 to 25% of the surface area of the finished product. The fine particles can be conveniently produced by breaking up a sheet of approximately 0.010 to about 0.02 inch thick.

The plastic chips are preferably within the range of about 0.18 to about 1.00 inch in diameter. They necessarily have to be at least three or four times as large as the finer particles to produce the desired decorative design in the finished product. A chip thickness of about 0.01 to about 0.025 inch is suitable for consolidation into a sheet of about 0.03 inch. The thickness of the chips should be less than the thickness of the final sheet. A most attractive product is obtained by using chips of various sizes formed initially from a sheet having a jaspe or marbleized decoration. A product having an appearance of a wide range in chip size can be obtained by allowing a few of the chips to overlap at various points in the product.

Further objects, features and advantages of the invention will be apparent from the following detailed description when read in conjunction with the drawings which are illustrative of one method of carrying out the invention and wherein.

Figure 1:
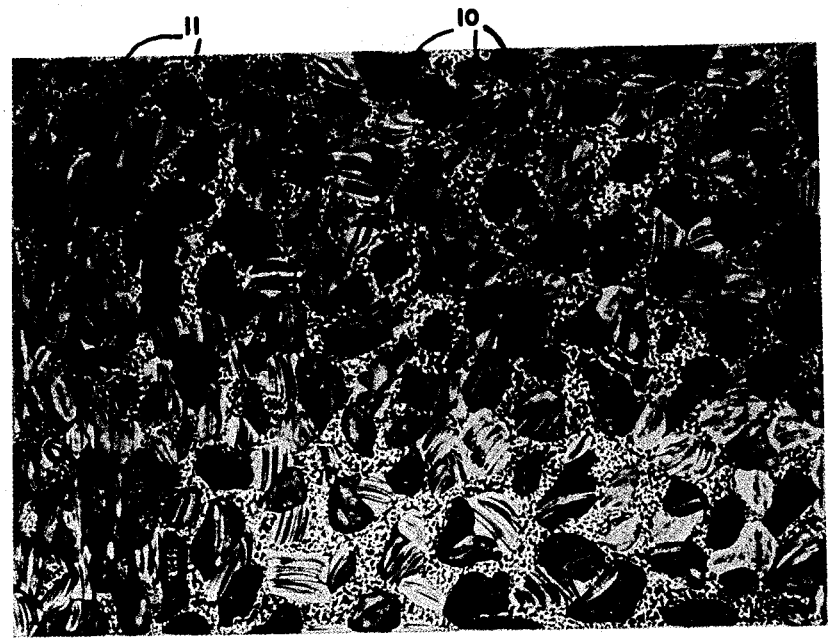
Fig. 1 is a plan view of a plastic flexible smooth surface covering which illustrates the effect obtained in accordance with the invention.
Figure 2:
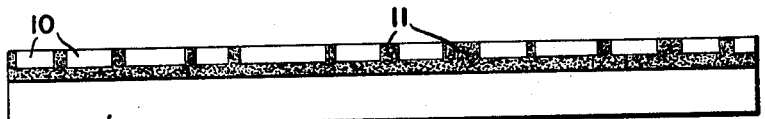
Fig. 2 is a cross sectional view of the surface covering of Fig. 1.
Figure 3:
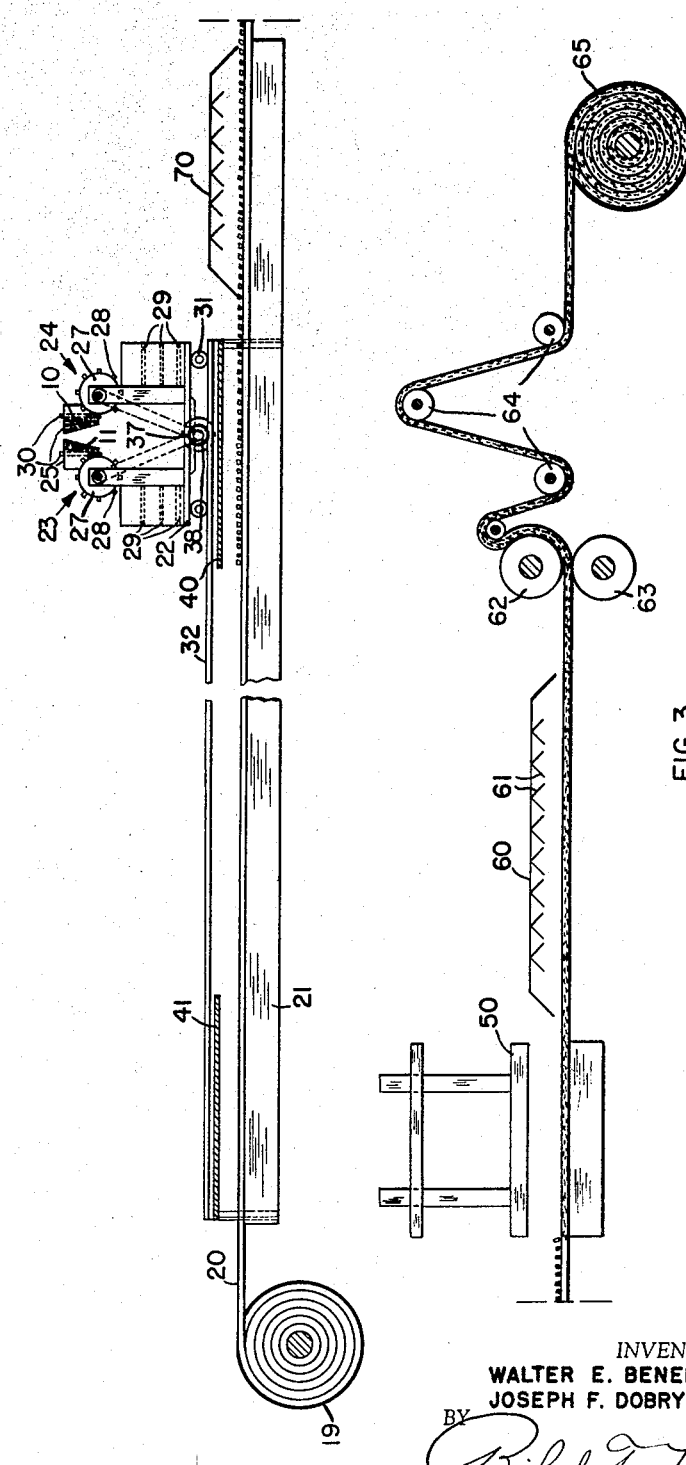
Fig. 3 is a diagrammatic side elevational view which is illustrative of one type of apparatus which can be used in the practice of the invention having the feeding mechanism at rest.
Figure 4:
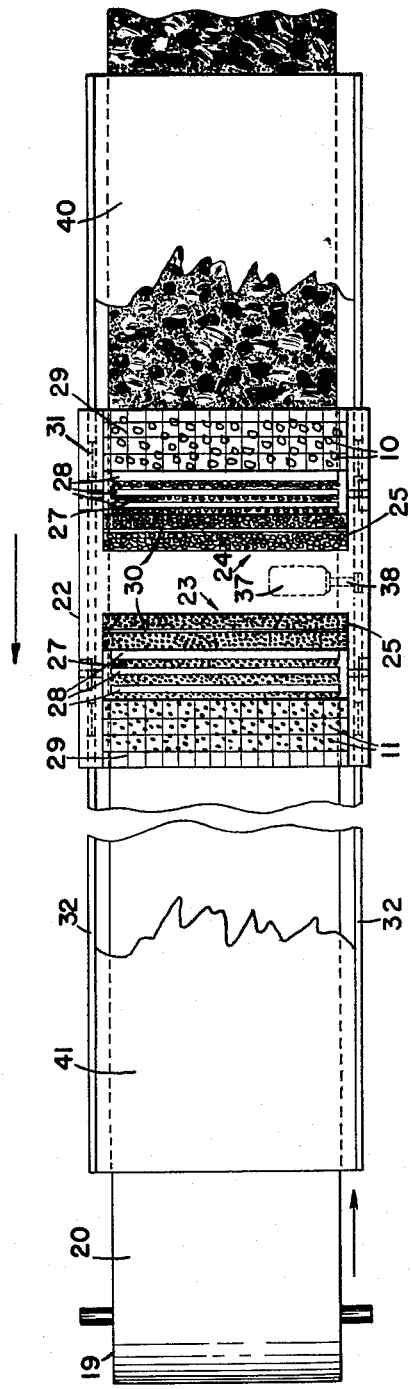
Fig. 4 is a diagrammatic top plane of the apparatus shown in Fig. 3 with the feeding mechanism in operation.
Figure 5:
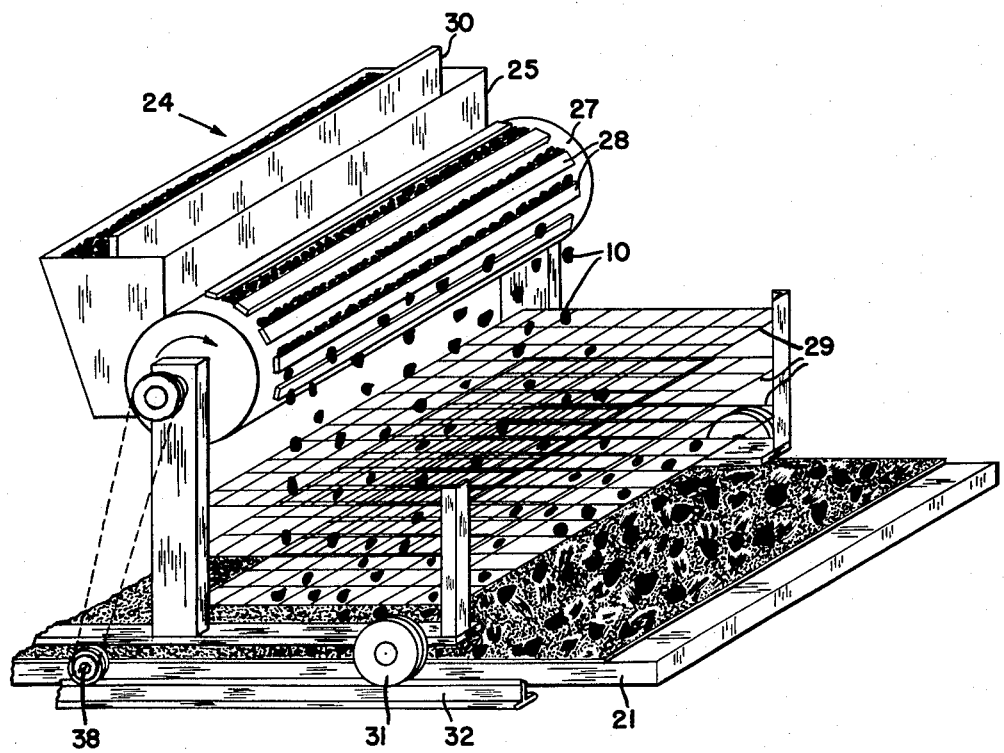
Fig. 5 is a perspective view of part of the feeding apparatus shown in Figs. 2 and 3 for applying plastic particles and chips to a backing web.

The process of this invention is applicable to various types of plastic composition used in surface coverings.

including linoleum, rubber compositions, asphalt compositions, synthetic resin type plastic compositions and the like. Each type of plastic composition requires its own particular processing conditions. The invention finds particular usefulness in the manufacture of surface coverings of thermoplastic synthetic resin compositions. The synthetic resin composition type will be taken as typical in the description of certain embodiments of the invention which follow. The product produced in accordance with the invention is shown in Figs. 1 and 2 and comprises plastic chips 10 imbedded in the matrix of fine granules 11. A backing material is indicated at 20. A suitable backing material 20 such as a fibrous felt is supplied from a roll 19 and passed over a fixed bed 21. A section of the web 20 is then completely covered with fine multicolored particles 11 of plastic composition. Chips 10 of similar plastic composition are scattered on top of the layer of particles in such a manner that they substantially cover the fine particles, but relatively few of the chips overlap or touch each other.

The application of the chips can be readily accomplished by a feeding mechanism, generally indicated at 22, comprising two separate feeding means 23 and 24 for supplying the chips 10 and particles 11, respectively. Each feeding means comprises a hopper 25 for holding the particles or chips of plastic composition, a feed wheel 27 having ribs 28 extending horizontally across its surface parallel to the axis of the roll and a series of screens 29 in vertical alignment for distributing the particles or chips in a uniform manner as they fall from the feed wheels.

In the operation of the feeding mechanism 22, the particles and chips are placed in separate hoppers 25 and are uniformly fed to their respective feed wheels 27. The amount of material allowed to press against the feed wheel 23 is limited by insertion of a baffle 30 which extends into the hopper, dividing it into two compartments. It is necessary for the chips or particles to pass under the baffle 30 before they can press against the feed wheel. The feed wheel 27 with its associated ribs 28 revolves and the ribs pick up a limited number of pieces from the hopper carrying them in an upward direction through the path of travel of the roll and drops them on the top screen of the screens 29. This upward pick up of the pieces has the advantage that gravity serves as the doctoring means for limiting the amount of material picked up. The pieces pass through the screens 29 and are thereby uniformly distributed on the web 20.

The feeding mechanism 23 is mounted on a wheeled cart 31 which moves along tracks 32 located parallel to and above the web. As the wheeled cart 31 passes along the tracks a uniform layer of particles is distributed over a section of the stationary web from one feeding means 23. In like manner, the second feeding means 24 feeds the large chips 10 and randomly distributes them on top of the layer of fine particles 11. The wheeled cart 31 is driven by means of a motor 37 through a drive wheel 38. In order to insure a uniform application of material to a section of the stationary web, shelves 40 and 41 are provided at each end of the web. The feeding mechanism 22 is placed in operation by setting in horizontal motion and by revolving the feed wheels 27 while over the shelf 40 at one end of the web. The particles flowing from the feed wheels 23 through the screens 29 are caught on the shelf and, thereby, prevented from falling on the surface of the web 20. The shelf 40 is long enough to allow the wheeled cart 31 to obtain a uniform horizontal speed before the pieces begin to fall on the web 20. In a like manner, the second shelf 41 at the opposite end of the section of the stationary section of the web to be covered is placed so that particles cannot fall on the web while the wheeled cart is slowing down to a stop. This manner of operation assures a completely uniform application of particles over the entire surface of the web.

After the web is covered with the pieces of plastic composition, a portion of the section of the covered web is pulled into a press 50 which applies heat and pressure to the web, thereby consolidating the plastic composition into a smooth uniform sheet. When the pressing operation is complete on one portion of the web, the web is moved to align the next portion of covered web in the press. The next section of the web is then pressed to consolidate the pieces in that section into a uniform sheet. The operation is continued until the uncovered web is in alignment between the shelves 40 and 41. When the section of the web between the shelves 40 and 41 is completely uncovered, feeding means 22 is again put into operation to cover another portion of web with plastic particles while the web is held stationary. In this manner, a press which necessitates step-wise movement of the web can be utilized with a continuous means for applying a uniform layer of pieces on the web. The feeding mechanism 23, as illustrated, is constructed to cover the web lengthwise. It can also be constructed so that it crosses the web transversely. If constructed for transversal operation, the feeding mechanism 23 will have to make a greater number of passes over the felt.

After the web leaves the press, it can then be subjected to further treatment such as planishing, fusing, embossing or similar operations to produce the finished product. The subsequent treatment given the pressed web will depend in great part upon the particular plastic composition utilized. When using a synthetic resin plastigel composition, the initial pressing is only a consolidation of the pieces of composition on the web. It is necessary, therefore, to subject the pressed covered web to a fusing and planishing operation. Such a treatment can be carried out by heating the pressed plastic composition on the web to fusion temperature by suitable heating means 60, such as infra red lamps 61. The heated sheet is then passed through a planishing unit consisting of two rolls 62, 63 to further smooth the fused sheet. Depending on the type of finish desired on the sheet, the planishing operation can be carried out with either a steel roll or a roll with a resilient covering pressing against the surface of the plastic composition. By employing an embossing roll as one of the rolls, it is possible to emboss and press the surface of the sheet in one operation. The sheet can then be passed over suitable cooling means, such as cooling drums 64, and then wound on a collecting roll 65. The sheet can be used with its backing or the backing can be stripped from the plastic composition sheet.

If the plastic composition is a conventional plasticized thermoplastic synthetic resin composition, the fusing of the resin can be carried out in the initial pressing step. With this type of composition, it is preferred to heat the composition to approach fusion temperature prior to pressing by a suitable heating means 70. This preheating of the material shortens the time required for pressing. When the fusion of the vinyl resin takes place in the initial pressing operation, it is usually necessary to use some means to prevent the composition from sticking to the press. Mold release fluids, such as silicone oils, have found wide use in this regard. Another effective method is to place a paper sheet with a suitable treated surface between the plastic material and the press. Such a method is described in U.S. Patent 2,772,141, issued November 27, 1956. The pressed sheet can then be subjected to a glossing operation by passing between a heated chrome plated sheet roll 62, contacting the surface of the sheet, and a steel or a resilient covered roll 63, contacting the back of the web.

If the plastic composition is a linoleum composition, it is desirable to use two presses in series, the first press being an initial consolidation of the material on the backing and the second pressing operation serving to further smooth and finish the surface of the sheet.

As mentioned hereinabove, any plastic composition which is capable of being formed into fine particles and chips and then molded can be used in accordance with this invention. The composition usually contains a binder, plasticizer, stabilizer, pigments and filler. A particularly useful surface covering can be made by utilizing a composition containing a thermoplastic synthetic resin, such as polyvinyl resin. Suitable polyvinyl compositions are disclosed, for example, in U.S. Patent 2,558,378, which issued on June 26, 1951. The polyvinyl resins are the most widely used in floor coverings and particularly polyvinyl chloride polymers and copolymers of polyvinyl chloride and polyvinyl acetate containing from about 80 to 98 percent vinyl chloride. The resins of this type which are of particular usefulness are thermoplastic resins having a softening point above about 150° F. and specific viscosity above about 0.17 as measured in a solution containing 0.20 gram of resin per 100 milliliters of nitrobenzene at 20° C. Copolymers of vinyl chloride with dibutyl maleate, ethyl acrylate, methyl acrylate, butyl acrylate, methyl ethyl acrylate, and butylmethylacrylate, all containing substantially the same amount of combined vinyl chloride and having the same viscosity, also have been used. In addition, copolymers of vinyl chloride and acrylonitrile containing about 45% to 80% vinyl chloride are used, as well as copolymers of vinyl chloride and vinylidene chloride. Typical of other suitable resins are polyacrylonitrile, polymethylacrylates and hydrocarbon resins such as polybutylene and polyethylene.

The synthetic resinous material can be plasticized by any of a number of plasticizers such as tricresyl phosphate, dioctyl phthalate, dibutyl phthalate, tributyl phosphate, butyl glycollate, dimethyl ethyl phthalate, chlorinated paraffin and the like. The plasticized synthetic resinous binder is mixed with suitable fillers and pigments which can constitute from about 20% to about 80% by weight of the composition. Typical fillers are calcium carbonate, clay, silica flour, wood flour and asbestos. Typical formulation comprises from about 20% to about 50% synthetic resin, about 10% to about 30% plasticizer and about 20% to about 80% filler, including pigments. When using these conventional plastic compositions, the fusing of the composition will ordinarily take place in the initial pressing step.

A particularly suitable type of plastic composition for carrying out the invention is a plastigel. Plastic compositions of this type usually must be heated to a temperature between 275° F. and 375° F. to fuse the composition and require a pressure of about 400 to about 1,500 pounds per square inch in the pressing step. As stated above, when using such a composition, the initial pressing step is a consolidation of the composition and it is necessary to subject the pressed web to fusing and planishing operations. A plastigel is a plastic composition which can be sheeted and molded into shape without fusing the principal portion of the resinous binder which remains in discrete particles dispersed throughout the composition in an unfused and unplasticized state. The minor portion of the binder which is plasticized and fused serves as the binder to hold the composition together and allows it to be sheeted or otherwise formed into fine particles and chips. Suitable compositions of this type are disclosed in United States patent application S.N. 602,888, filed August 8, 1956, by Robert K. Petry and John B. Weaver. A particularly useful plastic composition of this type contains from about 15 to 35% principal binder composed of a polyvinyl chloride resin or one of its copolymers, 2 to 10% of a minor binder composed of a copolymer of butadiene and acrylonitrile elastomer, about 6 to 15% plasticizer and the remainder filler. The plastigel is formed by mixing the minor portion of binder, plasticizer and filler together at the fusion temperature of the binder, cooling the mixture, and then dispersing the principal binder throughout the mixture in an unplasticized and unfused state. The mixture is then sheeted and converted to fine particles or chips at temperatures below the fusing and plasticizing point of the principal binder. The initial pressing and consolidation, when using a plastigel, is carried out at a temperature of about 250° F. to 300° F. and a pressure of between about 800 to 1,500 pounds per square inch. This pressing usually required from six to twelve seconds. The subsequent fusing is carried out at a temperature of 300 to 375° F. and the planishing operation at a top roll temperature of about 200° to 275° F.

The plastic composition can also be an uncured linoleum. Linoleum is composed of drying or semidrying oils, resin, fillers and pigments. The siccative oil can be linseed, tall, perilla, rubberseed or any oil which upon oxidation yields a substantial amount of the oxidized glycerides of linolic and/or linolenic acids in fluid phase. The resin can be rosin, ester gum, fused congo, congo ester, kauri gum or the like. The filler can be ground cork, wood flour, whiting, china clay, asbestine or the like. A typical linoleum formulation contains from 25 to 50% linoleum cement, 25 to 35% vegetable filler and 25 to 40% mineral filler. The linoleum composition is prepared by mixing the siccative oil and resin and oxidizing the mixture while heating. When the linoleum cement has been properly oxidized and aged, it is mixed with the filler and pigment and calendered into a sheet. The initial pressing of linoleum in the process of the invention would usually be carried out in a conventional press or a rotary press at a temperature of about 160° to 220° F. and a pressure of about 400 pounds per linear inch.

The web on which the plastic composition is pressed can be stripped off the final product or it can be an integral part of the product. If the web is to form part of the product, it is preferably coated with an adhesive prior to applying the plastic composition to aid in binding the composition to the web. A particularly suitable adhesive is one that becomes tacky upon heating. Such an adhesive coated web can be prepared by coating it with an emulsion of a mixture of Vinsol and synthetic rubber and drying the coating to remove the water. Such a method of forming an adhesive coated backing material is described in United States Patent 2,757,711, which issued on August 7, 1956, to Robert K. Petry et al. The backing material can be cloth, burlap, felt or similar material. The most conventional backing material is felt having a thickness ranging from about 0.025 to about 0.10 inch with an average of about 0.04 inch. The density of floor covering felt is considerably less than that of paper. The density is generally less than that reflected by a gauge to weight ratio of 0.8 measured according to the formula:

$$\frac{\text{thickness of felt in inches} \times 1000}{\text{weight of 480 square feet of felt}}$$

with the lower values representing the higher densities. The felt is preferably impregnated with a waterproofing agent such as asphalt, pitch, rubber, rubber-like compounds and resinous compounds such as polyvinylacetate.

This invention has been described when using a conventional press, but the pressing operation can be carried out by using a rotary press or calender rolls. In such a case, care must be taken to prevent the pieces from changing their position as they pass through the calender rolls since any change of position will destroy the character of the design. In order to avoid any streaking of the pieces and chips, it is necessary to use compositions which will readily flow together to form the uniform surface required.

The thickness of the plastic layer on the web can be varied depending on the ultimate use of the product. If the product is to be used with a backing, a thickness of about .020 to .060 inch is normally required. If, on the other hand, the backing web is to be stripped from the final product, a somewhat thicker layer is desirable, such as 0.030 to 0.08 inch.

The fine particles and flakes can be conveniently prepared by granulating thin sheets of plastic composition of about 0.01 to 0.025 inch in thickness by passing through a multi-knife granulator equipped with a screen having openings large enough to allow the particles or flakes desired to pass through. Further screening will eliminate the pieces which are too small.

The use of the process of this invention is particularly suitable to form a smooth sheet having a novel decoration. The soft, easily flowed base layer of fine particles facilitates the consolidating of the relatively large chips into a smooth, defect-free sheet. The multicolored blend of fine particles provides an attractive background contrast which sets off the appearance of the chips in a remarkable way.

Any departure from the above description which conforms to the present invention is intended to be included in the scope of the claims.

We claim:

1. An apparatus for producing a smooth, flexible surface covering, which comprises supporting means for supporting a portion of a web of backing material in a stationary position, a first movable feeding means adapted to move over and to completely cover the portion of the web with fine particles of plastic material, a second movable feeding means adapted to move over and distribute materially larger chips on top of the fine particles covering the portion of the web in a random fashion so that a substantial portion of the fine particles are covered with the chips, said two feeding means being connected to move and operate in unison, horizontal retaining shelves disposed at each end of the portion of the web to be covered to prevent any particles of material from falling on the web while said two feeding means are being accelerated and decelerated thereby providing uniform coverage of the web, pressing means for consolidating the particles and chips into a uniform sheet and means for intermittently feeding the covered portion of the web from the supporting means to the pressing means.

2. The apparatus of claim 1 wherein said two feeding means comprise a hopper for holding the particles of plastic composition, a rotating cylinder having horizontal slots for receiving portions of the particles from the hopper when traveling in an upward direction and a series of vertically disposed screens for distributing the material onto the web over a wide area as it falls from the slots by the force of gravity.

3. The apparatus of claim 2 wherein the two feeding means are mounted on a moving platform so that a substantial portion of the stationary web can be covered with the pieces and chips.

4. The apparatus of claim 1 wherein the horizontal retaining shelves have identical, irregular leading edges to eliminate any lap mark at the edge of each portion of covered web.

5. An apparatus for producing a smooth, flexible surface covering which comprises means for supporting a portion of a web of backing material in a stationary position, feeding means adapted to move parallel to the stationary web to uniformly cover the portion of the web with pieces of plastic composition, horizontal retaining shelves disposed at each end of the stationary portion of the web to prevent any pieces from falling on the web while said feeding means is being accelerated and decelerated, pressing means for consolidating the particles into a uniform sheet and means for feeding the covered portion of the web from the supporting means to the pressing means.

6. The apparatus of claim 5 wherein the horizontal retaining shelves have irregular, identical leading edges to eliminate any lap marks between successive portions of the covered web.

References Cited in the file of this patent

UNITED STATES PATENTS

| | | |
|---|---|---|
| 1,001,836 | Fritz | Aug. 29, 1911 |
| 2,302,183 | Burns | Nov. 17, 1942 |
| 2,775,994 | Rowe | Jan. 1, 1957 |